United States Patent [19]
Read et al.

[11] Patent Number: 5,673,295
[45] Date of Patent: Sep. 30, 1997

[54] METHOD AND APPARATUS FOR GENERATING AND SYNCHRONIZING A PLURALITY OF DIGITAL SIGNALS

[75] Inventors: Andrew J. Read, Sunnyvale; Sani El-Fishawy, Santa Clava; Robert Mardjuki, Danville; Michael Lee, Mountain View, all of Calif.

[73] Assignee: Synopsis, Incorporated, Mountain View, Calif.

[21] Appl. No.: 421,062

[22] Filed: Apr. 13, 1995

[51] Int. Cl.$^6$ ........................................ H04L 7/00
[52] U.S. Cl. ............................ 375/356; 375/371
[58] Field of Search ..................... 375/354, 362, 375/371, 377, 356; 370/100.1, 103, 705.2; 327/144, 146, 155

[56] References Cited

U.S. PATENT DOCUMENTS

| | | | |
|---|---|---|---|
| 3,720,131 | 3/1973 | Frohock, Jr. et al. | 89/41 ME |
| 3,764,995 | 10/1973 | Helf, Jr. et al. | 340/172.5 |
| 3,832,535 | 8/1974 | De Vito | 235/153 AC |
| 3,854,125 | 12/1974 | Ehling et al. | 340/172.5 |
| 3,922,537 | 11/1975 | Jackson | 235/153 AC |
| 3,976,940 | 8/1976 | Chau et al. | 324/73 R |
| 4,055,801 | 10/1977 | Pike et al. | 324/73 R |
| 4,092,589 | 5/1978 | Chau et al. | 324/73 R |
| 4,102,491 | 7/1978 | DeVito et al. | 235/302 |
| 4,168,796 | 9/1979 | Fulks et al. | 235/302 |
| 4,216,533 | 8/1980 | Ichimiya et al. | 365/230 |
| 4,236,246 | 11/1980 | Skilling | 371/27 |
| 4,450,560 | 5/1984 | Conner | 371/25 |
| 4,456,880 | 6/1984 | Warner et al. | 324/158 D |
| 4,488,354 | 12/1984 | Chan et al. | 29/830 |
| 4,517,661 | 5/1985 | Graf et al. | 364/900 |

(List continued on next page.)

FOREIGN PATENT DOCUMENTS

| | | | |
|---|---|---|---|
| 150260A2 | 7/1985 | European Pat. Off. | G06F 11/26 |
| 2123156 | 1/1984 | United Kingdom | G01R 19/165 |
| 2164768 | 3/1984 | United Kingdom | G06F 15/60 |

OTHER PUBLICATIONS

Widdoes, L.C., Jr. and Harding, W., "CAE Station Uses Real Chips to Simulate VLSI–Based Systems," *Electronic Design*, Mar. 22, 1984, pp. 167–176.

(List continued on next page.)

*Primary Examiner*—Stephen Chin
*Assistant Examiner*—Kevin Kim
*Attorney, Agent, or Firm*—Haverstock & Associates

[57] ABSTRACT

A hardware interface generates and synchronizes precisely timed digital signals. The hardware interface receives data bits and associated timing information for application to a Hardware Modeling Element (HME). Preferably there are at least two modules, each including a clock generating circuit which has an input for receiving a master clock signal, a divider circuit for generating therefrom a plurality of evenly timed internal clock signals, wherein a first one of the internal clock signals rises at the same time as the master clock signal, and a phase adjusting circuit for receiving a feedback control signal for adjusting a phase delay in accordance with a sensed throughput delay. Each module also includes a timing multiplexer which receives the internal clock signals and each having a plurality of data channels, each having approximately the same throughput delay. Each data channel also has an input for receiving a data bit, a controller for receiving the timing information which allows selection of the one internal clock signal which most closely matches the timing information, and an output port coupled to the HME. The timing multiplexer also has a dummy channel from which the sensed delay is determined. The sensed delay approximates the throughput delay. The dummy channel receives the first one of the internal clock signals and provides the feedback control signal. Finally, the hardware interface apparatus includes a timing adjustment control circuit for selectively delaying the output signal in one timing multiplexer to compensate for a slower throughput delay in another multiplexer.

6 Claims, 2 Drawing Sheets

Microfiche Appendix Included
(5 Microfiche, 345 Pages)

U.S. PATENT DOCUMENTS

| | | | |
|---|---|---|---|
| 4,527,249 | 7/1985 | Van Brunt | 364/578 |
| 4,544,882 | 10/1985 | Flora | 324/73 R |
| 4,587,625 | 5/1986 | Marino, Jr. et al. | 364/578 |
| 4,590,581 | 5/1986 | Widdoes, Jr. | 364/578 |
| 4,594,544 | 6/1986 | Necoechea | 324/73 AT |
| 4,628,471 | 12/1986 | Schuler et al. | 364/578 |
| 4,635,218 | 1/1987 | Widdoes, Jr. | 364/578 |
| 4,635,259 | 1/1987 | Schinabeck et al. | 371/20 |
| 4,639,664 | 1/1987 | Chiu et al. | 324/73 |
| 4,644,487 | 2/1987 | Smith | 364/578 |
| 4,646,299 | 2/1987 | Schinabeck et al. | 371/20 |
| 4,656,632 | 4/1987 | Jackson | 371/20 |
| 4,675,673 | 6/1987 | Oliver | 340/825.87 |
| 4,686,627 | 8/1987 | Donovan et al. | 364/481 |
| 4,695,968 | 9/1987 | Sullivan, II et al. | 364/578 |
| 4,714,875 | 12/1987 | Bailey et al. | 324/73 |
| 4,724,378 | 2/1988 | Murray et al. | 324/73 R |
| 4,744,084 | 5/1988 | Beck et al. | 371/23 |
| 4,764,925 | 8/1988 | Grimes et al. | 371/20 |
| 4,771,428 | 9/1988 | Acuff et al. | 371/25 |
| 4,782,440 | 11/1988 | Nomizu et al. | 364/200 |
| 4,787,061 | 11/1988 | Nei et al. | 364/900 |
| 4,806,852 | 2/1989 | Swan et al. | 324/73 |
| 4,816,750 | 3/1989 | Van der Kloot et al. | 324/73 R |
| 4,931,723 | 6/1990 | Jeffrey et al. | 371/22.3 |
| 5,036,473 | 7/1991 | Butts et al. | 364/489 |
| 5,114,353 | 5/1992 | Sample | 439/65 |
| 5,259,005 | 11/1993 | LaRosa et al. | 375/355 |
| 5,259,006 | 11/1993 | Price et al. | 373/107 |
| 5,352,123 | 10/1994 | Sample et al. | 439/61 |
| 5,353,243 | 10/1994 | Read et al. | 364/578 |
| 5,369,593 | 11/1994 | Papamarcos et al. | 364/488 |
| 5,425,036 | 6/1995 | Liu et al. | 371/23 |
| 5,459,752 | 10/1995 | Chen | 375/354 |
| 5,528,636 | 6/1996 | Sevenhans et al. | 375/354 |
| 5,551,013 | 8/1996 | Beausoleil et al. | 395/500 |

OTHER PUBLICATIONS

Stoll, P., "PMX: A Hardware Solution to the VLSI Model Availability Problem," IEEE Proceedings of the International Conference on Computer Design, Oct., 1985.

Johnson, "Considerations in Selecting a Physical Modeling Systems," ADEE Technical Session Proceedings, Sep., 1986, pp. 225–231.

Johnson, "Software vs. Hardware Models for Simulation," Design Automation Guide, 1988.

Bisset, S., "LSI Tester Gets Microprocessors to Generate Their Own Test Patterns," *Electronics*, May 25, 1978, pp. 141–145.

Albrow, R., "2–head Auto–test System Takes on Complex VLSI," *Electronic Design*, Mar. 5, 1981, pp. 79–84.

Giles, D., and Bowden, K., "Maintaining Simulation Accuracy Through Physical Device Models," IEEE Proceedings of the International Test Conference, 1985.

Parker, *Integrating Design and Test: Using CAE Tools for ATE Programming*, Computer Society Press of the IEEE, 1987, ISBN No. 0–8186–8788–5.

Widdoes, L.C., Jr. and Stump, H., "Hardware Modeling," *VLSI Systems Design*, Jul., 1988.

Gillette, G., "Tester on VLSI With 264–K Vectors Behind Its Pins," *Electronics*, Nov. 3, 1981, pp. 122–127.

"Testing a TV Character Generator with the Sentry II Sequence Processor," *Fairchild Systems Technology*, Fairchild Technical Bulletin 4, Nov. 1974, pp. 1–12.

Huston, R., "Description of the Intel 8085 Microprocessor Test Programs for the Sentry II/VII with Sequence Processor Module," *Fairchild Systems Technology*, Nov., 1977, pp. 1–12.

U.S. patent application Ser. No. 518,134 filed Oct. 25, 1974.

METHOD AND APPARATUS FOR GENERATING AND SYNCHRONIZING A PLURALITY OF DIGITAL SIGNALS

This patent document includes two microfiche appendices. The first microfiche appendix includes 3 sheets of microfiche with 203 frames. The second microfiche appendix includes 2 sheets of microfiche with 142 frames.

A portion of the disclosure of this patent document (found in the microfiche appendices) contains material which is subject to maskwork (first appendix) and copyright (second appendix) protection. The maskwork and copyright owner has no objection to the facsimile reproduction by anyone of the patent document or the patent disclosure, as it appears in the Patent and Trademark patent file or records, but otherwise reserves all maskwork and copyright rights whatsoever.

FIELD OF THE INVENTION

This invention relates to the field of generating and synchronizing accurately timed digital signals. More particularly, this invention relates to the field of Hardware Modelers used in developing electronic systems.

BACKGROUND OF THE INVENTION

Computer Aided Design (CAD) tools are routinely used to aid design engineers to develop new electronic devices, systems and products. To reduce the effort of building prototypes of a potential new design, design engineers use CAD tools to model the design and simulate its operation. Such CAD tools typically include computer simulations of many common commercially available components such as resistors, transistors, capacitors and more complicated devices such as microcontrollers and microprocessors.

The design engineer can "build" a simulated version of the design by writing a simulation program that appropriately joins together such computer simulation models. The design can then be tested by applying appropriate stimulus that simulate anticipated real-life operating conditions to determine the response of the design.

There are a variety of reasons why using a computer simulation model of one or more devices may be unsuitable even for such a CAD test. Some examples are that a simulation model may not be available, a device may be too complicated to develop a true computer simulation model, or there may be certain critical parameters in the design that require prototyping using a physical device rather than a simulated device. Such prototyping can require a physical device for only one component in a design. For such an application, it is desirable to build a computer simulation model of the remainder of the design and interface the computer on which the simulation is being performed to a physical device for the critical component which is conventionally known as a Hardware Modeling Element (HME).

When constructing a simulation that includes an HME, a computer simulation representing the non-HME portions of the design is developed. A hardware interface is constructed for providing signals from the computer simulation to the HME and from the HME to the computer simulation. Such hardware interfaces to HMEs could be built as single purpose devices for interfacing to a particular HME. Because HMEs are often integrated circuits, a single purpose hardware interface will preclude coupling another type of integrated circuit HME having a different number of pins.

What is needed is a hardware interface to an HME which is expandably adaptable to accept HMEs having differing numbers of pins. What is further needed is a hardware interface which can automatically operate to synchronize data signals applied to the HME. What is further needed is a hardware interface which is modularly expandable with modules each having an indeterminate and disparate throughput delay yet the hardware interface still automatically operates to synchronize data signals among the modules for application to the HME.

SUMMARY OF THE INVENTION

A hardware interface apparatus generates and synchronizes a plurality of precisely timed digital signals. The hardware interface is coupled to receive a plurality of data bits and timing information for each of the data bits. The data bits are for application to a Hardware Modeling Element (HME) according to a simulation. The timing information for each data bit specifies a predetermined time that the data bit is to be applied to the HME. In the preferred embodiment, there is at least one module. Each module includes a clock generating circuit. Each clock generating circuit includes an input for receiving a master clock signal running in a predetermined range of frequencies, a divider circuit coupled to the input for receiving the master clock signal and for generating therefrom a plurality of evenly timed internal clock signals, and a phase adjusting circuit for receiving a feedback control signal for adjusting a phase delay in accordance with a sensed throughput delay. Each module also includes a timing multiplexer which is coupled to receive the internal clock signals from an appropriate one of the clock generating circuits. Each of the timing multiplexers includes a plurality of data channels, each having an approximately same throughput delay, and also having a data channel input for receiving a predetermined one of the data bits, and a controller for receiving the timing information which allows selection of the one internal clock signal which most closely matches the timing information. Each data channel also includes an output port for coupling an appropriately timed output signal representative of the data bit to an input of the HME. The timing multiplexer also has a dummy channel with the sensed delay which approximates the throughput delay. The dummy channel receives the first one of the internal clock signals and provides the feedback control signal. Finally, the hardware interface apparatus includes a timing adjustment control circuit for selectively delaying the data channel input bit in one timing multiplexer to compensate for a slower throughput delay in another multiplexer.

DETAILED DESCRIPTION OF THE PREFERRED EMBODIMENT

The preferred embodiment of the present invention is for a method of and apparatus for interfacing between a simulation computer and a Hardware Modeling Element (HME). The HME comprises a physical element in a simulated system or design. Typically the HME will be one or more integrated circuits, such as a microprocessor. Ideally, simulation stimuli are applied in sequence to the input pins of the HME to elicit responses which are then returned from the HME to the simulation computer. One bit in each of the stimulus vectors is coupled to one of the input pins of the HME. It is particularly important that the bit be applied to the HME at precise predetermined times. These stimuli and responses are used to determine whether the simulated system was properly designed to achieve one or more desired functions.

The apparatus comprises a hardware interface that receives signals from the simulation computer. The signals include a plurality of data bits and timing information regarding the data bits. In addition a master clock signal is used. According to the preferred embodiment, the hardware interface is assembled with one or more identical modules. Each module is configured to provide fourteen data bits to the HME. It will be readily understood by persons of ordinary skill in the art that modules can be constructed according to the teaching of the present invention which provide different numbers of data bits to the HME. Each module will have a different throughput delay. The throughput delay of each module will also vary to some degree as the operating conditions, such as temperature and level of supply voltage, vary. If the HME is an integrated circuit with more than 14 pins, more than one module will be used to transmit signals between the pins and the simulation computer. These signals must be synchronized through the different modules so that the programmed timing intervals between signals can be achieved. Therefore, each module is tested and calibrated in order to compensate correctly for the particular throughput delay of each module. The majority of the phase difference is corrected by a phase lock loop.

Figure 1:
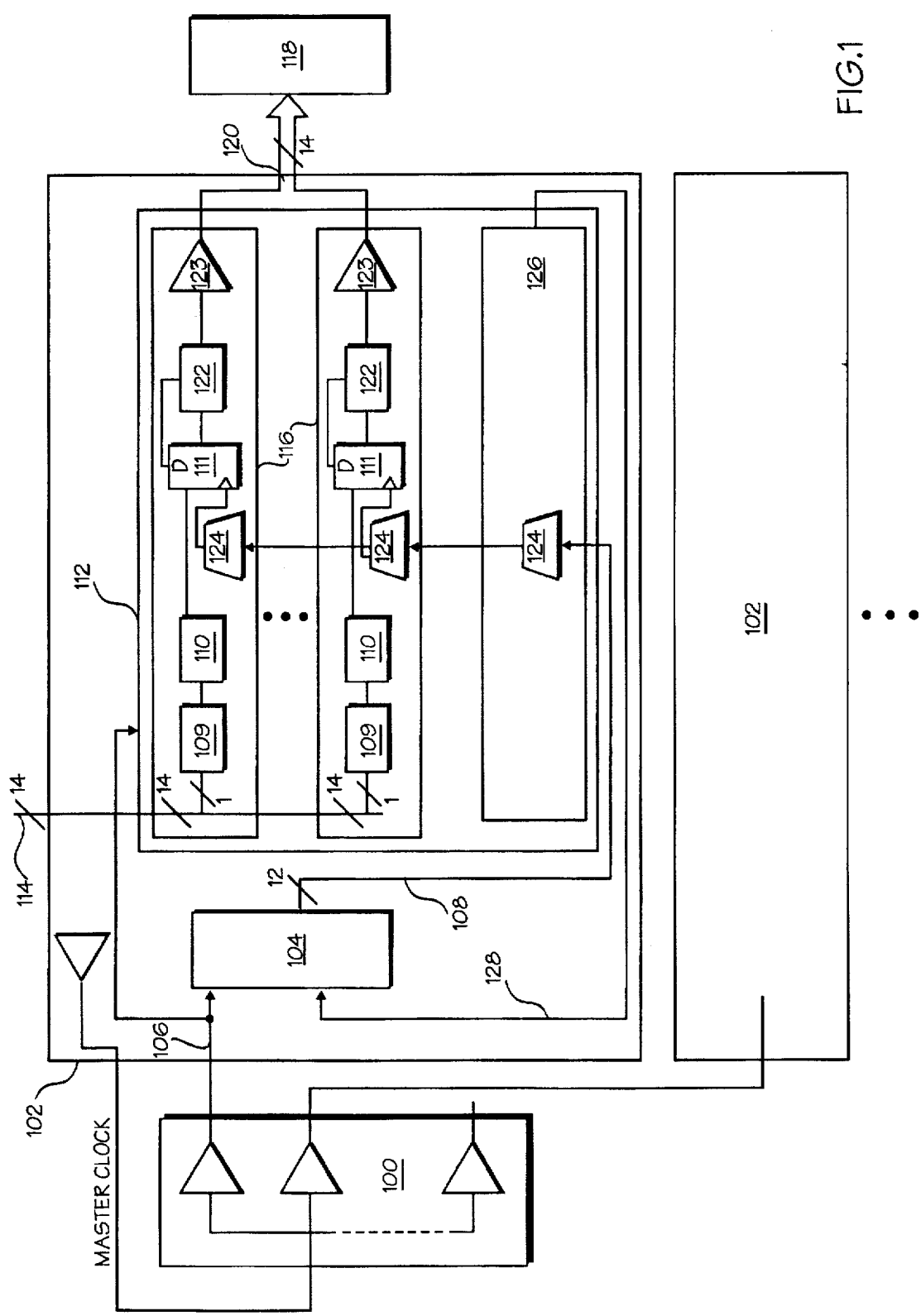
FIG. 1 shows a block diagram of the hardware interface of the present invention.

As shown in FIG. 1, each modula 102 includes three basic functional blocks that will be described in more detail below. The first basic functional block is a clock generating circuit 104. The clock generating circuit 104 receives a master clock signal 106 from the computer simulator or generates the master clock signal using any known technique. In the preferred embodiment, one module 102 generates the master clock signal and provides it to all the other modules in the hardware interface. The master clock signal 106 is provided to each module using conventional driver circuits 100. Because an unknown number of modules 102 can be coupled to receive the master clock signal 106, it is preferred that a separate driver be available for all potential modules 102. This avoids the problems associated with signal loss and impedance degradations associated with coupling additional modules in parallel to receive the master clock signal 106. Care must also be taken to ensure that the phase of the master clock signal 106 arrives at each module 102 at precisely the same moment. Persons of ordinary skill in the art will recognize that techniques such as designing all master clock signal traces to the same length, same impedance and the like can be used to avoid skew in the master clock signal 106 arriving at all the modules 102. Similarly, each module 102 in the preferred embodiment is identically designed to avoid skew developing in the master clock signal within the various modules. Other techniques can also be effectively used.

The master clock signal 106 is divided into a plurality of evenly spaced in time internal clock signals 108 each having an identical period. In the preferred embodiment, there are twelve internal clock signals 108 each having the same period as the master clock signal each at a different phase. The twelve internal clock signals are generated by the clock generating circuit 104 using the master clock signal MCLK 106 as a reference. The twelve internal clock signals 108 provide signal at evenly spaced intervals within the period of the master clock signal MCLK 106. It will be apparent to one of ordinary skill in the art that any other convenient number of divisions can also be used to achieve the advantages of the present invention.

The internal clock signals 108 are provided to a timing multiplexer 112. The timing multiplexer 112 is configured to receive data bits and timing information 114 from the simulation computer (not shown). A data bit is coupled to an input data path circuit 109 which in turn is coupled to an Early-Middle-Late (EML) circuit 110 which will be functionally described below. The timing multiplexer includes a plurality of data channels 116, each for providing a data bit to the HME 118 via a fourteen bit output bus 120. The output of each data channel 116 is coupled to provide signals to a respective pin on the HME 118. Each data channel also includes a control circuit 122 that receives the timing information for use in determining which of the internal clock signals 108 to use in coupling the data bit to the output bus 120. Once the selection of the appropriate timing is made, the control circuit 122 controls a multiplexer 124 to couple the appropriate internal clock signal 108 as a clock for coupling the data bit to the output bus 120. The output of the EML 110 is applied to a D-type flip flop 111 and the internal clock signal selected by the multiplexer 124 is used to clock the flip flop 111 to latch the data to the control circuit 122. The output of the control circuit is coupled to a driver circuit 123. The output of the driver circuit 123 is coupled to provide the output of the data channel to a respective pin on the HME 118.

Each of the timing multiplexers in the preferred embodiment is formed in a single integrated circuit. Multiple integrated circuits, each having a timing multiplexer, are then configured together to provide signals to the HME 118. The number of timing multiplexers required will be dependent on the maximum number of pins to which the system is configured to supply data signals.

The data channels 116 in a single timing multiplexer 112 are designed to have a throughput delay which is similar, one to the other. The throughput delays for the data channels 116 in one timing multiplexer 112 are not likely to be the same as the throughput delays for the data channels 116 in another timing multiplexer 112 due to differences in manufacturing processes for the various timing multiplexer integrated circuits. Therefore, in order to compensate for the different throughput delays and to ensure that signals arrive at the pins of the HME 118 as programmed, each integrated circuit must be tested and calibrated.

Each timing multiplexer 112 also includes a dummy channel 126. The dummy channel 126 is designed to have a delay that is the same as the throughput delay for the data channels 116 in the same timing multiplexer integrated circuit. The first internal clock signal 108 is coupled as a synchronization input 128 to the clock generator circuit 104. Because the output of the dummy channel 126 has a rising edge at the same time as the master clock signal 106, the clock generating circuit can use that output to adjust the phase of the internal clock signals to compensate for the delay in the dummy channel 126. Because the delay in the dummy channel is designed to be the same as the throughput delays in the data channels 116 of the respective timing multiplexer, the throughput delays attributable to the data channels 116 are also compensated.

As discussed above, the throughput delays in the data channels 116 in a single timing multiplexer 112 are the same. However, the throughput delays can be significantly different from one timing multiplexer 112 to the next. Because each of the clock generating circuits 104 receives the same master clock signal 106 at the same time, and then synchronizes the output of its respective dummy channel 126 to the master clock, the internal clock signals 108 can be phase shifted in delivery from one timing multiplexer 112 to another in order to account for different throughput delays and thereby achieve synchronized signals on the output bus 120.

As is well known, a predetermined set-up and hold time is necessary in digital circuits before a signal is clocked. Without providing an adequate set-up and hold time, the output is indeterminate. In the preferred embodiment, the throughput delay for a fast data channel 116 can be on the order of half as long as for a slow data channel. It is thus possible that two timing multiplexers 112 can receive a data bit at the same time from the data bus 114, attempt to clock that bit onto the output bus 120 using the same internal clock designation and have only one of the signals be correctly transmitted to the HME. This is because .one of the set-up and hold time requirements for clocking the data bit can be violated in one of the timing multiplexers 112 due to differences in the throughput delays. This violation can cause an incorrect data bit to be coupled to the HME.

To correct for this problem, data is provided at three different intervals, early, middle and late. The middle data is phase-shifted one-half clock cycle later than the early data. The late data is phase-shifted one-half clock cycle later than the middle data and a whole clock cycle later than the early data.

A calibration algorithm is performed amongst the various timing multiplexers 112 by the EML circuit 110 in order to determine which of the internal clock signals work with the early, middle or late data. In the calibration algorithm, a predetermined data pattern is transmitted to all the data channels 116 of a module. Each of the internal clock signals is then selected in turn by the multiplexer 124, using early data, to determine which of the internal clock signals are stable using the early data. The first and last stable internal clock signals are determined. This process is repeated for the module, selecting middle and late data, and determining which internal clock signals are stable with each. This calibration operation is performed on all of the modules within the system.

Using the calibration operation, the EML 110 can thus determine which of the timing multiplexers 112 have slow throughput delays, which have intermediate throughput delays and which have fast throughput delays. The EML is then used to skew the selected internal data signal to account for significant variances in speed between the various timing multiplexers 112. The first stable internal clock signal of the slowest timing multiplexer 112 is assigned as the first logical edge of all of the timing multiplexers 112. Using the information learned from the calibration operation, each logical edge or internal clock signal is then assigned early, middle or late data. Because the late data is phase-shifted a whole clock period from the early data, it should be noted that the early and late data edges are exactly the same edges. The EML circuit 110 must therefore select early or late data for a respective data pattern based on which edge was chosen as the first logical edge and whether or not the timing multiplexer 112 has a slow or fast throughput delay.

For a timing multiplexer with a fast throughput delay the data must be clocked through at a slightly later time than the data for a multiplexer with a slow throughput delay, in order to have a signal output from the data channels simultaneously. In the preferred embodiment, for a slow timing multiplexer, early or middle data may be chosen for a respective logical edge, while middle or late data may be chosen, respectively for the same logical edge for a fast timing multiplexer.

When a data pattern is programmed to be output by a timing multiplexer, the bit is coupled to the input data path circuit 109 of the appropriate data channel and in turn to the EML circuit. The control circuit 122 receives the corresponding timing information for the data bit. The control circuit 122 will then select the appropriate internal clock signal to be used to output the bit at the programmed time. It is then determined whether the early, middle or late data should be used as the input to the flip flop 111 to latch the bit into the data channel. At the appropriate time, the appropriate internal clock signal strobes the D-type flip flop 111 and the bit is output from the flip flop 111, passed through the control circuit 122 and driven onto the output bus 120 by the driver 123. In this manner, the data bit is delivered to the appropriate pin on the HME 118 by the appropriate data channel 116.

In the preferred embodiment, the EML 110 and the timing multiplexer are manufactured on a single integrated circuit. That integrated circuit is available as part of an HME exercising system from Synopsys, Inc., at 700 East Middlefield Road, Mountain View, Calif. 94043-4033.

Appendix A includes all the VERILOG code for the integrated circuit which includes a timing multiplexer 112 and its associated EML 110. From the VERILOG, a person of ordinary skill in the art could produce a complete set of schematic diagrams for the integrated circuit. Additionally, one could provide the VERILOG to a mask vendor for production of a complete set of manufacturing masks to duplicate the integrated circuit.

Appendix B includes the control software for the EML circuit. The control software instructs the EML and the integrated circuit to perform the calibration algorithm described above. In addition, the control software instructs the EML in selectively skewing the selection of the internal clock signals to compensate for differences in the throughput delays between two or more timing multiplexers.

Figure 2:
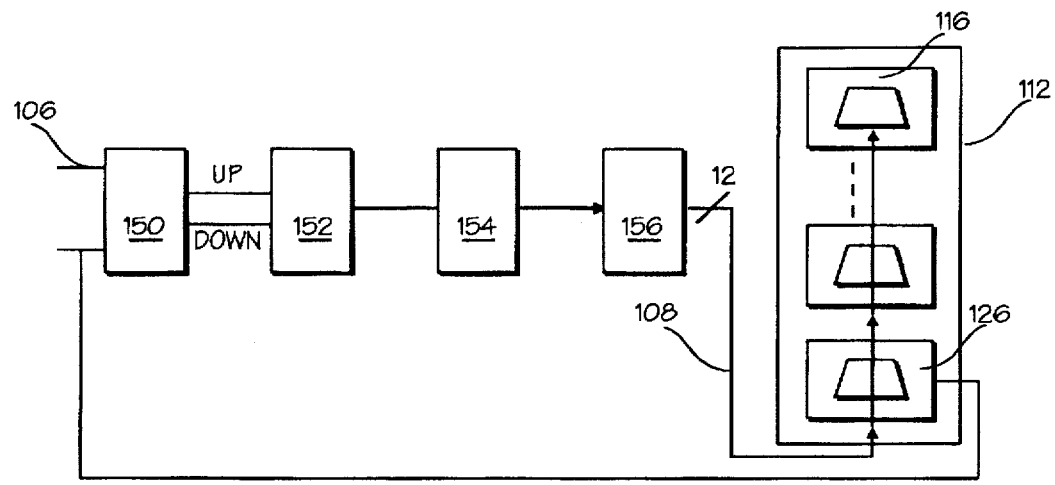
FIG. 2 shows a block diagram of a portion of the clock generating circuit 104 of FIG. 1.

FIG. 2 shows a block diagram of a portion of the clock generating circuit 104 (FIG. 1) of the preferred embodiment. Where appropriate, the same reference numerals will be used for the same elements in the various drawings to simplify understanding of the invention. The circuit of the preferred embodiment is for a phase locked loop such as is conventionally known. The circuit includes a phase detector 150 which compares the master clock signal to the feedback signal from the dummy channel 126. The phase detector 150 generates an up or down signal such as found in the prior art which in turn is coupled to a charge pump 152. Any conventional charge pump 152 can be used. The output of the charge pump 152 is coupled to a conventional loop filter 154. The loop filter 154 is coupled to a voltage controlled oscillator (VCO) 156 which generates the twelve internal clock signals 108 which are coupled in turn to the timing multiplexer 112 as described in more detail above.

Figure 3:
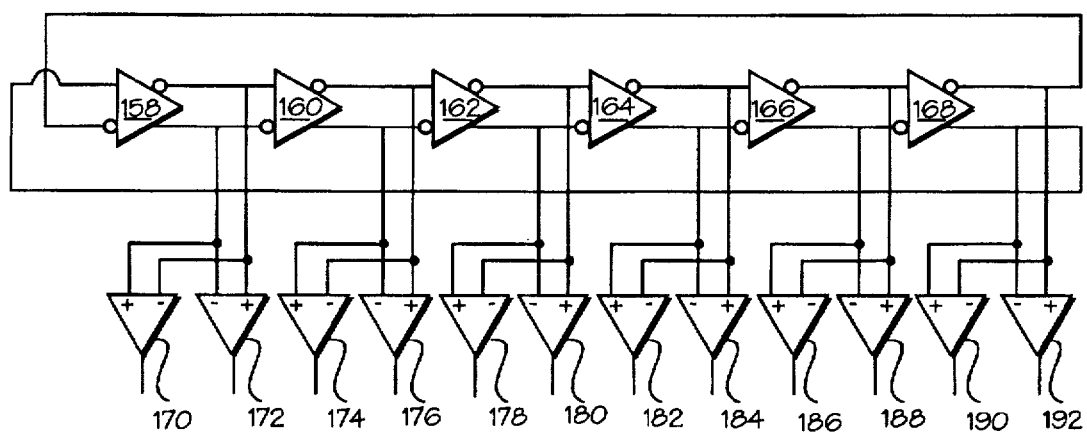
FIG. 3 shows a more detailed diagram of the voltage controlled oscillator 156 of the circuit of FIG. 2.

In the preferred embodiment, the VCO 156 is a ring oscillator as shown in FIG. 3. The ring oscillator includes six differential buffers 158, 160, 162, 164, 166 and 168. As is known, a pulse circulates from the buffer 158 to the buffer 160 to the buffer 162 to the buffer 164 to the buffer 166 and finally to the buffer 168. In passing from the buffer 158 to the buffer 160, the signal is inverted. Each time the signal is passed from one buffer to the next it is inverted through the buffer 168. The signal is not inverted as it is passed from the buffer 168 to the buffer 158. In addition to being coupled to the next differential buffer in the ring oscillator, the differential output of each of the buffers is coupled to two differential amplifiers. For example, the outputs of the buffer 158 are coupled to the inputs of the two differential amplifiers 170 and 172. Note that the polarity of the connections to the inputs of the two differential amplifiers 170 and 172 are reversed. In this way, the twelve internal clock signals of the preferred embodiment are generated using only a six stage ring oscillator.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

What is claimed is:

1. An apparatus for generating and synchronizing a plurality of precisely timed digital signals, the apparatus coupled to receive a plurality of data bits and timing information for each of the data bits, the apparatus for providing each one of the data bits to a Hardware Modeling Element (HME) at a predetermined time specified by the timing information, the apparatus comprising:
   a. a clock generating circuit comprising:
      (1) an input for receiving a master clock signal having a predetermined range of frequencies;
      (2) a divider circuit coupled to the input for receiving the master clock signal and for generating therefrom a plurality of evenly timed internal clock signals; and
      (3) a phase adjusting circuit for receiving a feedback control signal and for adjusting a phase delay within the plurality of internal clock signals in accordance with a sensed throughput delay; and
   b. a timing multiplexer, coupled to receive the internal clock signals from the clock generating circuit, the timing multiplexer comprising:
      (1) a plurality of data channels, each having an approximately same throughput delay within each data channel, each data channel comprising:
         (a) a data channel input for receiving a predetermined one of the data bits;
         (b) a controller for receiving the timing information for the predetermined one of the data bits and for selecting one of the internal clock signals which most closely matches the timing information; and
         (c) an output port for coupling an output signal representative of the predetermined one of the data bit to the HME at the predetermined time; and
      (2) a dummy channel having the sensed throughput delay which approximates the approximately same throughput delay, the dummy channel having a dummy input coupled to receive a first one of the internal clock signals and a dummy output coupled to provide the feedback control signal.

2. An apparatus for generating and synchronizing a plurality of precisely timed digital signals, the apparatus coupled to receive a plurality of data bits and timing information for each of the data bits, the apparatus for providing each one of the data bits to a Hardware Modeling Element (HME) at a predetermined time specified by the timing information, the apparatus comprising:
   a. at least two clock generating circuits, each clock generating circuit comprising:
      (1) an input for receiving a master clock signal having a predetermined first period;
      (2) a divider circuit coupled to the input for receiving the master clock signal and for generating therefrom a plurality of evenly timed internal clock signals; and
      (3) a phase adjusting circuit for receiving a feedback control signal and for adjusting a phase delay within the plurality of internal clock signals in accordance with a sensed throughput delay; and
   b. at least two timing multiplexers, coupled to receive the internal clock signals from one of the clock generating circuits, each timing multiplexer comprising:
      (1) a plurality of data channels, each having an approximately same throughput delay within each data channel, each data channel comprising:
         (a) a data channel input for receiving a predetermined one of the data bits;
         (b) a controller for receiving the timing information for the predetermined one of the data bits and for selecting one of the internal clock signals which most closely matches the timing information; and
         (c) an output port for coupling an output signal representative of the data bit to the HME at the predetermined time; and
      (2) a dummy channel having the sensed throughput delay which approximates the approximately same throughput delay, the dummy channel having a dummy input coupled to receive a first one of the internal clock signals and a dummy output coupled to provide the feedback control signal,
   wherein the throughput delays for each of the timing multiplexers need not be identical.

3. An apparatus for generating and synchronizing a plurality of precisely timed digital signals, the apparatus coupled to receive a plurality of data bits and timing information for each of the data bits, the apparatus for providing each one of the data bits to a Hardware Modeling Element (HME) at a predetermined time specified by the timing information, the apparatus comprising:
   a. at least two clock generating circuits, each clock generating circuit comprising:
      (1) an input for receiving a master clock signal having a predetermined first period;
      (2) a divider circuit coupled to the input for receiving the master clock signal and for generating therefrom a plurality of evenly timed internal clock signals; and
      (3) a phase adjusting circuit for receiving a feedback control signal and for adjusting a phase delay within the plurality of internal clock signals in accordance with a sensed throughput delay;
   b. at least two timing multiplexers, each coupled to receive the internal clock signals from a respective one of the clock generating circuits, each timing multiplexer comprising:
      (1) a plurality of data channels, each having an approximately same throughput delay within each data channel, each data channel comprising:
         (a) a data channel input for receiving a predetermined one of the data bits;
         (b) a controller for receiving the timing information for the predetermined one of the data bits and for selecting one of the internal clock signals which most closely matches the timing information; and (c) an output port for coupling an output signal representative of the data bit to the HME at the predetermined time;

(2) a dummy channel having the sensed throughput delay which approximates the approximately same throughput delay, the dummy channel having a dummy input coupled to receive a first one of the internal clock signals and a dummy output coupled to provide the feedback control signal, wherein the throughput delays for each of the timing multiplexers need not be identical; and c. a timing adjustment control circuit coupled to each of the timing multiplexers for selectively delaying the data bits as input signals in one timing multiplexer to compensate for a slower throughput delay in another multiplexer.

4. A method of generating and synchronizing a plurality of precisely timed digital signals, and providing the digital signals to a Hardware Modeling Element (HME) at a predetermined time, the method comprising:

a. receiving a plurality of data bits and timing information for each of the data bits;

b. receiving a master clock signal having a predetermined range of frequencies;

c. generating a plurality of evenly timed internal clock signals from the master clock signal;

d. receiving a feedback control signal and adjusting a phase delay within the plurality of internal clock signals in accordance with a sensed throughput delay;

e. coupling the internal clock signals to a plurality of data channels, each having an approximately same throughput delay within each data channel;

f. receiving a predetermined one of the data bits;

g. selecting one of the internal clock signals which most closely matches the timing information for the predetermined one of the data bits;

h. coupling a first one of the internal clock signals to a dummy channel having the sensed delay which approximates the approximately same throughput delay; and i. providing an output of the dummy channel as the feedback control signal.

5. A method of generating and synchronizing a plurality of precisely timed digital signals, and providing the digital signals to a Hardware Modeling Element (HME) at a predetermined time, the method comprising:

a. receiving a plurality of data bits and timing information for each of the data bits;

b. receiving a master clock signal having a predetermined first period;

c. generating a plurality of evenly timed internal clock signals from the master clock signal;

d. receiving a feedback control signal and adjusting a phase delay within the plurality of internal clock signals in accordance with a sensed throughput delay;

e. coupling the internal clock signals to one group of a plurality of data channels, each of the data channels in each group having an approximately same throughput delay within each data channel;

f. receiving a predetermined one of the data bits;

g. selecting one of the internal clock signals which most closely matches the timing information for the predetermined one of the data bits;

h. coupling a first one of the internal clock signals to a dummy channel having the sensed delay which approximates the approximately same throughput delay; and i. providing an output of the dummy channel as the feedback control signal.

6. A method of generating and synchronizing a plurality of precisely timed digital signals, and providing the digital signals to a Hardware Modeling Element (HME) at a predetermined time, the method comprising:

a. receiving a plurality of data bits and timing information for each of the data bits;

b. receiving a master clock signal having a predetermined first period;

c. generating a plurality of evenly timed internal clock signals from the master clock signal;

d. receiving a feedback control signal and adjusting a phase delay within the plurality of internal clock signals in accordance with a sensed throughput delay;

e. coupling the internal clock signals to one group of a plurality of data channels, each of the data channels in the group having an approximately same throughput delay within each data channel;

f. receiving a predetermined one of the data bits;

g. selecting one of the internal clock signals which most closely matches the timing information for the predetermined one of the data bits;

h. coupling a first one of the internal clock signals to a dummy channel having the sensed delay which approximates the approximately same throughput delay;

i. providing an output of the dummy channel as the feedback control signal; and j. adjusting the step of selecting to compensate for different throughput delays in different groups.

* * * * *

UNITED STATES PATENT AND TRADEMARK OFFICE
CERTIFICATE OF CORRECTION

PATENT NO.   : 5,673,295
DATED        : September 30, 1997
INVENTOR(S)  : Read, et. al.

It is certified that error appears in the above-identified patent and that said Letters Patent is hereby corrected as shown below:

Title page, item [75], inventor:   address should be --Santa Clara--.

item [73], Assignee:   delete "Synopsis" and insert--Synopsys--.

Signed and Sealed this

Sixteenth Day of December, 1997

Attest:

BRUCE LEHMAN

Attesting Officer

Commissioner of Patents and Trademarks